(12) United States Patent
Lin et al.

(10) Patent No.: US 7,688,532 B1
(45) Date of Patent: Mar. 30, 2010

(54) LENS SYSTEM

(75) Inventors: Mei-Chun Lin, Taipei Hsien (TW);
Chun-Hsiang Huang, Taipei Hsien (TW); Hsin-Tsung Yeh, Taipei Hsien (TW); Wei-Hsiu Chang, Taipei Hsien (TW); Kuang-Wei Lin, Taipei Hsien (TW); Kuan-Ting Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/430,057

(22) Filed: Apr. 24, 2009

(30) Foreign Application Priority Data

Oct. 30, 2008 (CN) .......................... 2008 1 0305289

(51) Int. Cl.
*G02B 7/02* (2006.01)

(52) U.S. Cl. ...................................... 359/819; 359/740

(58) Field of Classification Search .................. 359/664, 359/708, 738–740, 819
See application file for complete search history.

(56) References Cited

U.S. PATENT DOCUMENTS 6,239,922 B1 * 5/2001 Nakamura ................... 359/739

* cited by examiner

*Primary Examiner*—Joseph Martinez
(74) *Attorney, Agent, or Firm*—Zhigang Ma

(57) ABSTRACT

A lens system includes a first lens and a second lens in order from the object side thereof. The first lens includes a first optical portion and a first mounting portion surrounding the first optical portion. The second lens includes a second optical portion with a concave object side surface, and a second mounting portion surrounding the second optical portion. The second mounting portion includes a connecting surface surrounding an object side surface of the second optical portion. Wherein the angle formed between the connecting surface and the axis of the lens system satisfies a certain condition.

8 Claims, 1 Drawing Sheet

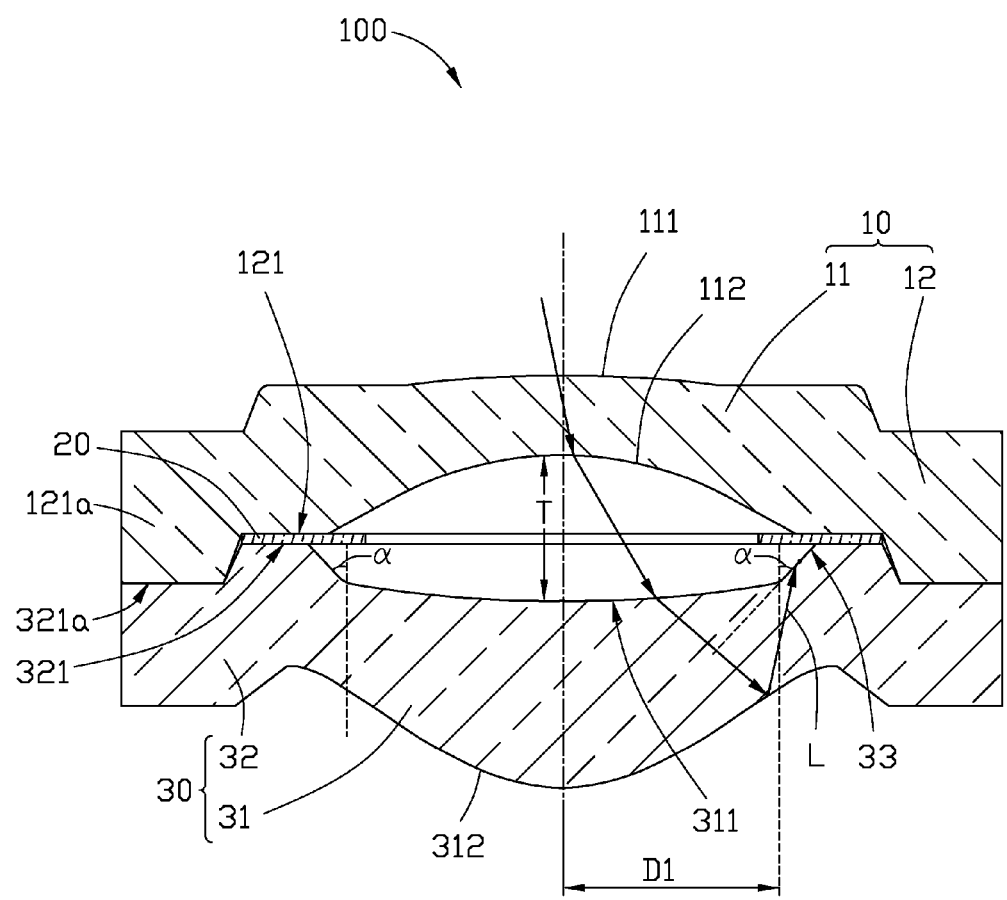

LENS SYSTEM

BACKGROUND

1. Technical Field

The present disclosure relates to lens systems and, particularly, to a lens system capable of reducing ghost or flare.

2. Description of Related Art

With the development of the optical imaging technology, camera modules are becoming widely used in electronic devices, such as digital cameras and mobile phones.

A lens of a camera module often includes an optical portion located at the center thereof and a mounting portion surrounding the optical portion. The mounting portion engages a spacer or barrel of a camera module, to easily secure the lens. The light from an object incident on the mounting portion surrounding the optical portion is usually reflected to the image side and forms a ghost or flare, thus degrading the quality of the image captured by the lens system.

What is needed, therefore, is a lens system which can overcome or at least alleviate the above-described problem.

BRIEF DESCRIPTION OF THE DRAWING

Many aspects of the present lens system can be better understood with reference to the accompanying drawing. The components in the drawing are not necessarily drawn to scale, the emphasis instead being placed upon clearly illustrating the principles of the present lens system.

The drawing is a schematic view of a lens system according to an exemplary embodiment.

DETAILED DESCRIPTION

Embodiments of the present disclosure will now be described in detail below, with reference to the accompanying drawing.

Referring to the drawing, a lens system 100, according to an exemplary embodiment, is shown. The lens system 100 includes a first lens 10, a stop 20, and a second lens 30 in order from the object side to the image side of the lens system 100.

The first lens 10 includes a first optical portion 11 and a first mounting portion 12 surrounding the first optical portion 11. The first optical portion 11 is configured for refracting a portion of light from an object incident on the first optical portion 11 to the second lens 30. The first optical portion 11 includes an object side surface 111 and an image side surface 112 facing the second lens 30. The first mounting portion 12 is configured for contacting a barrel (not shown) and/or spacer (not shown) etc., to secure the first lens 10. The first mounting portion 12 includes a first engaging surface 121 facing the second lens 30. Protrusions and/or recesses can be formed on the first engaging surface 121. In this embodiment, a ring-shaped protrusion 121a is formed on the first engaging surface 121. The first lens 10 can be plastic or glass.

The second lens 30 includes a second optical portion 31 and a second mounting portion 32 surrounding the second optical portion 31. The second optical portion 31 is aligned with the first optical portion 11 of the first lens 10 along an optical axis of the lens system 100 and configured for refracting a portion of light from an object incident on the second optical portion 31 towards an image sensor (not shown) to form an image of the object. The second mounting portion 32 is configured for contacting a barrel (not shown) and/or spacer (not shown) etc., to secure the second lens 30. The second optical portion 31 includes an object side surface 311 facing the first lens 10 and an image side surface 312 away from the first lens 10. The object side surface 311 is concave, and can be spherical surface or aspherical surface. The second lens 30 can be plastic or glass.

The second mounting portion 32 includes a second engaging surface 321 facing the first lens 10. Protrusions and/or recesses can be formed on the second engaging surface 321. In this embodiment, a ring-shaped recess 321a is defined on the second engaging surface 321 for engaging with the ring-shaped protrusion 121a on the first engaging surface 121. The precision of the alignment of the first lens 10 and the second lens 30 is a most important factor determining the image quality of the lens system 100. By using the ring-shaped recess 321a and the ring-shaped protrusion 121a, the precision of the alignment of the first lens 10 and the second lens 30 can be improved, accordingly, the image quality of the lens system 100 can be improved.

The second mounting portion 32 further includes a connecting surface 33 surrounding the object side surface 311 of the second optical portion 31. The connecting surface 33 connects the second engaging surface 321a and the object side surface 311 of the second optical portion 31. In order to improve the image quality of lens system 100, the connecting surface 33 satisfies the following condition:

$$\left(35 \times \frac{D1}{T} - 19\right) < \alpha < \left(45 \times \frac{D1}{T} - 23\right),$$

wherein D1 is the semi-diameter of the object side surface 311 of the second optical portion 31, T is a distance from the image side surface 112 of the first optical portion 11 to the object side surface 311 of the second optical portion 31 along the axis of the lens system 100, and $\alpha$ is an angle formed between the connecting surface 33 and the axis of the lens system 100.

During capturing an image of an object by the lens system 100, a portion of light L from the object incident on the connecting surface 33, after being reflected by the image side surface 312 of the second optical portion 31, will be reflected towards the object side of the lens system 100 by the connecting surface 33. Accordingly, exemplary light L, as shown in the drawing, cannot significantly affect the quality of the image captured by the lens system 100, and the image quality of the lens system 100 can be improved.

The stop 20 is arranged between the first lens 10 and the second lens 30. The stop 20 is configured for reducing the amount of light from an object entering the lens system 100. Preferably, the stop 20 is black in color and can absorb light incident thereon.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. A lens system comprising, in order from the object side:
   a first lens comprising a first optical portion and a first mounting portion surrounding the first optical portion; and
   a second lens comprising a second optical portion with a concave object side surface aligned with the first optical portion along an optical axis of the lens system, and a second mounting portion surrounding the second optical portion, the second mounting portion comprising a connecting surface surrounding an object side surface of the second optical portion, wherein the lens system satisfies the following condition:

$$\left(35 \times \frac{D1}{T} - 19\right) < \alpha < \left(45 \times \frac{D1}{T} - 23\right)$$

wherein, D1 is the semi-diameter of the object side surface of the second optical portion, T is a distance from an image side surface of the first optical portion to the object side surface of the second optical portion along the axis of the lens system, and α is an angle formed between the connecting surface and the axis of the lens system.

2. The lens system as claimed in claim 1, wherein the first mounting portion of the first lens comprises a first engaging surface facing the second lens, and the second mounting portion of the second lens comprises a second engaging surface for engaging with the first engaging surface, the second engaging surface is located surrounding the connecting surface of the second mounting portion.

3. The lens system as claimed in claim 2, wherein a ring-shaped protrusion is formed on the first engaging surface, and a ring-shaped recess is defined on the second engaging surface corresponding to the ring-shaped protrusion on the first engaging surface.

4. The lens system as claimed in claim 1, further comprising a stop arranged between the first lens and the second lens.

5. The lens system as claimed in claim 4, wherein the stop is black in color.

6. The lens system as claimed in claim 1, wherein the first lens is plastic or glass.

7. The lens system as claimed in claim 1, wherein the second lens is plastic or glass.

8. The lens system as claimed in claim 1, wherein the object side surface of the second optical portion is spherical surface or aspherical surface.

* * * * *